(12) United States Patent
Mohr et al.

(10) Patent No.: US 8,196,725 B2
(45) Date of Patent: Jun. 12, 2012

(54) DEVICE FOR THE ROTATIONALLY FIXED CONNECTION OF A SHAFT TO AT LEAST ONE COMPONENT MOUNTED TO ROTATE ON THE SHAFT

(75) Inventors: Mark Mohr, Tettnang (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1206 days.

(21) Appl. No.: 11/873,667

(22) Filed: Oct. 17, 2007

(65) Prior Publication Data

US 2008/0271554 A1 Nov. 6, 2008

(30) Foreign Application Priority Data

Oct. 19, 2006 (DE) .......................... 10 2006 049 283

(51) Int. Cl.
  *F16D 13/32* (2006.01)
  *F16D 25/08* (2006.01)
  *F16D 28/00* (2006.01)
(52) U.S. Cl. ............... 192/48.2; 192/48.91; 192/66.23; 192/70.15; 192/84.6; 192/85.49; 192/97; 192/30 W; 192/114 R
(58) Field of Classification Search .............. 192/97, 192/70.22, 70.15, 66.23
  See application file for complete search history.

(56) References Cited

U.S. PATENT DOCUMENTS

| | | | | |
|---|---|---|---|---|
| 160,570 A | * | 3/1875 | Carver | 192/82 R |
| 824,805 A | * | 7/1906 | Muller | 192/35 |
| 903,858 A | * | 11/1908 | Holcomb | 192/70.12 |
| 1,198,052 A | * | 9/1916 | Porter | 192/70.22 |
| 1,292,691 A | * | 1/1919 | Bowles | 192/66.23 |
| 1,449,717 A | * | 3/1923 | Woodin | 254/305 |
| 2,055,258 A | | 9/1936 | McNeil | |
| 2,070,065 A | * | 2/1937 | Pearmain | 192/70.2 |
| 2,521,607 A | * | 9/1950 | Rohn | 192/97 |
| 3,370,681 A | * | 2/1968 | Humphrey | 192/66.3 |
| 3,842,954 A | | 10/1974 | Hönemann | |
| 7,156,217 B2 | | 1/2007 | Raber | |

FOREIGN PATENT DOCUMENTS

| | | |
|---|---|---|
| CA | 2 451 899 A1 | 6/2004 |
| DE | 410 285 | 3/1925 |
| DE | 2 211 521 | 9/1973 |
| DE | 25 40 191 | 3/1977 |
| DE | 44 45 606 A1 | 7/1995 |
| DE | 100 33 649 A1 | 2/2001 |
| DE | 10 2005 021 633 A1 | 11/2006 |
| EP | 1 669 623 A1 | 6/2006 |
| WO | WO-91/15683 | 10/1991 |
| WO | WO-01/88402 A1 | 11/2001 |
| WO | WO-2005/042997 A1 | 5/2005 |

* cited by examiner

*Primary Examiner* — Richard M. Lorence
(74) *Attorney, Agent, or Firm* — Davis & Bujold, P.L.L.C.

(57) ABSTRACT

A device for connecting, in a rotationally fixed manner, a shaft to at least one component which is rotationally supported on the shaft, such as a gear wheel of a gear in a transmission. The device includes an actuating element that is rotationally fixed, but axially slides on the shaft, such that when the element is actuated by an actor, the element actively, frictionally communicates with the component to at least approximately equalize a rotational speed difference, between the component and the shaft. The actuating element can be actuated by the actor with a force to frictionally connect the component to the shaft in a rotationally fixed manner. The device further includes a holding device, which retains the actuating element in a shift condition essentially equivalent to the rotationally fixed condition of the component without further actuation of the actor.

26 Claims, 9 Drawing Sheets

DEVICE FOR THE ROTATIONALLY FIXED CONNECTION OF A SHAFT TO AT LEAST ONE COMPONENT MOUNTED TO ROTATE ON THE SHAFT

This application claims priority from German Application Serial No. 10 2006 049 283.8 filed Oct. 19, 2006.

FIELD OF THE INVENTION

The invention concerns a device for the rotationally fixed connection of a shaft to at least one component mounted to rotate on the shaft, preferably for the connection of at least one gearwheel of a gear of a transmission, made as a loose wheel, to a transmission shaft.

BACKGROUND OF THE INVENTION

Usually, gear wheels made as loose wheels of various gears of a transmission are connected in a rotationally fixed manner to a transmission shaft on which the loose wheels are arranged by way of synchronizers. With the synchronizers, when a gear of a transmission is engaged, rotational speed differences, between a loose wheel to be engaged and the transmission shaft associated with the loose wheel, are first equalized by the action of friction. When equality of speed has been reached, between the loose wheel and the transmission shaft, there is no longer any dynamic friction torque and a locking gear releases a claw of a synchronizer provided for the engagement of the loose wheel so that the desired gear can be engaged with positive interlock.

The disadvantage of such synchronizers is that they entail undesirable manufacturing effort and are, therefore, expensive to produce, because they are made with frictional, locking elements and claws.

Alternatively to the synchronizers described above, transmission devices are known from practice for the engagement of loose wheels, which are made with simply designed, frictional shift elements, such as lamellar shift elements. To maintain such shift elements in an engaged condition, generally, these must be acted upon by an actor with a holding force sufficient to maintain the engaged condition of the shift elements, which is produced mechanically, magnetically, pneumatically or hydraulically. However, this holding force that has to be applied constantly by an actor disadvantageously reduces the overall efficiency of the transmission.

From CA 2 451 899 A1 a frictional shift element with self-reinforcement is known, which remains in the engaged condition without a holding force that must be applied separately, because of an applied torque.

However, this has the disadvantage that the connection, between a component mounted to rotate in a shaft and the shaft itself, is made by positive interlock so that, in relation to driving comfort, the component can only be coupled to the shaft unproblematically when the rotation speed difference, between the component on a loose wheel and a shaft, is small. If engagement or rotationally fixed connection of the component to the shaft is required when the speed difference between the component and the shaft is large, the positive connection, to be formed by the self-reinforcement, between the shaft and the component results, because of the very short shift time in an impulse exchange with high torque peaks, leading to a deterioration of the driving comfort and to undesirably high component loads.

In addition, from DE-PS 410 285, a hydraulically actuated friction clutch for speed-change transmissions is known, whose structure is compact. In this case, a clutch disk of the friction clutch, by way of which a loose wheel arranged on a shaft can be connected in a rotationally fixed manner on the shaft, is acted upon directly from inside the shaft with a hydraulic pressure required to fix the loose wheel. The clutch disk is displaced in translation on the shaft by the action of the pressure to engage a gear.

Since a pressure space associated with the clutch disk, which is acted upon by the hydraulic pressure, is formed between gear wheels arranged to rotate on the shaft, low-friction and effective sealing can only be achieved by considerably elaborate seals. For that reason, high energy consumption is required in order to maintain the axial force for the rotationally fixed connection of a loose wheel to the shaft. Moreover, because of the large number of seals, the arrangement is characterized by high friction losses which again have an adverse effect on the overall efficiency of a transmission since the friction forces demand an increase of the actuation forces.

Accordingly, the purpose of the present invention is to provide an inexpensive device for the rotationally fixed connection of a shaft to at least one component mounted to rotate on the shaft, which improves the overall efficiency of a transmission by comparison with conventional transmissions.

SUMMARY OF THE INVENTION

In the device, according to the invention, for the rotationally fixed connection of a shaft to at least one component mounted to rotate on the shaft, preferably for connecting at least one gear wheel made as a loose wheel of a gear of a transmission to a transmission shaft, which is configured with at least one actuating element mounted rotationally fixed on the shaft and able to move in the axial direction, which can be brought by an actor when the actor is actuated into active frictional connection in some areas with the component and by way of which a rotation speed difference, between the component and the shaft, can be at least approximately equalized, the actuating element can be acted upon by the actor with an actuation force required for the rotationally fixed connection of the component to the shaft. In addition, associated with the actuating element is a holding device such that, without actuation of the actor, the actuating element can be held in a shift condition at least equivalent to the rotationally fixed condition of the component.

The actuating element is pressed by the actor against the component at least on a friction surface in the area of which the force required for the rotationally fixed connection of the component to the shaft is transferred. During the fictional fixing of the component to the shaft, the pressing force can preferably be adapted to the operating condition at the time. In this way, any desired synchronization processes, between the component and the shaft, can be arranged in a simple way in such manner that a high level of driving comfort is achieved.

By virtue of the additional device for holding the actuating element at least in a shift condition equivalent to the rotationally fixed condition of the component without actuation of the actor, the actor need only be supplied with energy during a shift process of the actuating element or component and thus only has to work during those operating phases. Thus, in a simple manner the energy demand of the actor is reduced, compared with conventionally configured transmissions. This improves the overall efficiency of a transmission, since the shift phases, starting from a rotationally fixed condition of the component relative to the shaft to a rotationally free condition or from the latter condition to the rotationally fixed condition, are considerably shorter compared with the duration of the holding phases of a component, i.e., a loose wheel of a transmission, in the rotationally fixed or rotationally free conditions.

BRIEF DESCRIPTION OF THE DRAWINGS

The invention will now be described, by way of example, with reference to the accompanying drawings. For the sake of clarity, the same indices are used for structurally and functionally equivalent components in the description of the various example embodiments. The drawing shows.

DETAILED DESCRIPTION OF THE INVENTION

Figure 1:
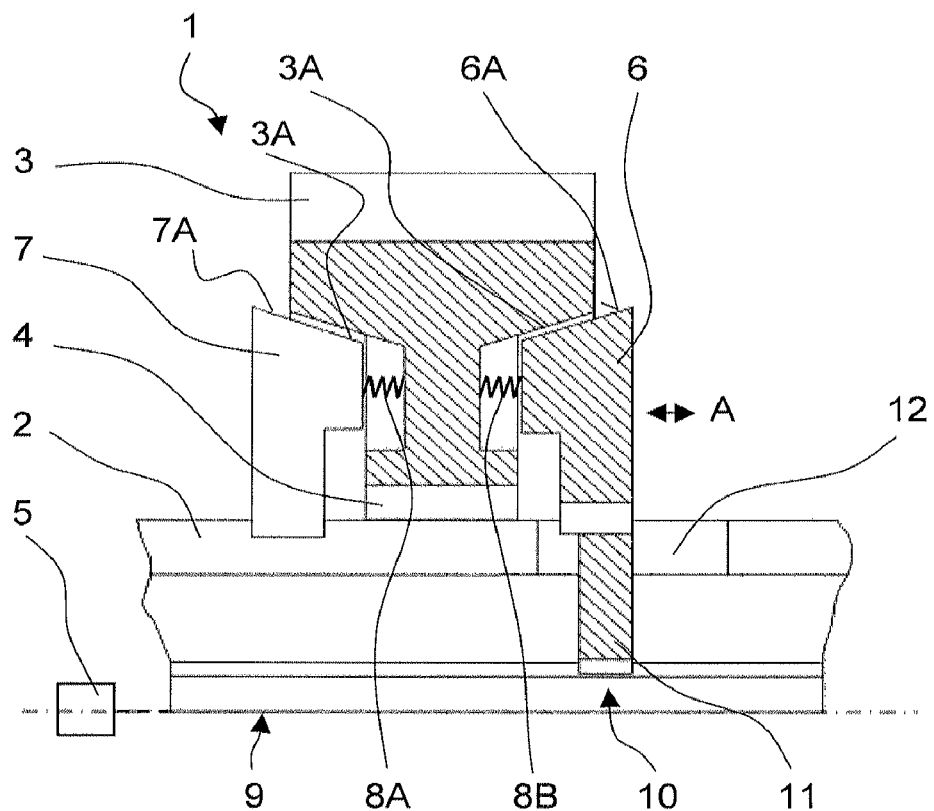
FIG. 1 is a first embodiment of the device, according to the invention, in an operating condition in which a component made as a gear wheel is free to rotate relative to a shaft.

FIG. 1 shows a device 1 for the rotationally fixed connection of a shaft 2 with at least one component 3 mounted to rotate on the shaft 2, the component in this case being a gear wheel of a gear of a transmission made as a loose wheel. The component is mounted to rotate on the shaft 2, via a bearing device 4, and can be connected in a rotationally fixed manner to the shaft 2 by corresponding actuation of an actor 5 in the manner described below.

In the present case, the shaft 2 is a countershaft of a countershaft drive, whose gear wheel 3 meshes in a manner not shown with a gear wheel of a main transmission shaft made as a fixed gear. This means that the device 1 is provided to connect the component 3 rotationally fixed to the shaft 2, in order to be able to transfer a torque applied to the shaft 2, via the component or gear wheel 3, to the gear wheel that meshes with the gear wheel 3 and hence to the main transmission shaft.

Deviating from the above, the device 1 can also be used in other transmission devices, such as automated shift transmissions, dual-clutch transmissions or planetary transmissions, for the automated actuation of a transmission device during shift processes and the like.

For the rotationally fixed connection of the component 3 to the shaft 2, in the device 1 shown in FIG. 1, an actuating element 6 is provided that can move in the axial direction and is mounted rotationally fixed on the shaft 2 which, when appropriately actuated by the actor 5, can be brought in some areas into active frictional connection with the component and by way of which a speed difference, between the component 3 and the shaft 2, can be at least approximately equalized by the actuating element 6 that can be actuated by the actor.

The actuating element 6 is acted upon by the actor 5 with the actuating force required in each case to engage the component 3 so that by way of a frictional connection, between the actuating element 5 and the component 3 and between the component 3 and an abutment face of an abutment element 7 fixed on the shaft and functioning as a shaft collar, the component 3 is held rotationally fixed. Both the abutment element 7 and the actuating element 6 are formed as disks and, by virtue of a slide bearing device, the actuating element 6 can be displaced relative to the shaft 2 in the direction indicated by the double-arrow A.

The abutment element 7 is arranged on the shaft 2 so that it cannot move in the axial direction and is also in rotationally fixed connection with the shaft 2. When the component 3 is shifted from a condition in which it can rotate relative to the shaft 2 into one where it is rotationally fixed or from a rotationally fixed condition to one where it can rotate relative to the shaft 2, both the component 3 and the actuating element 6 are displaced relative to the abutment element 7 along the axial direction on the shaft 2.

Figure 2:
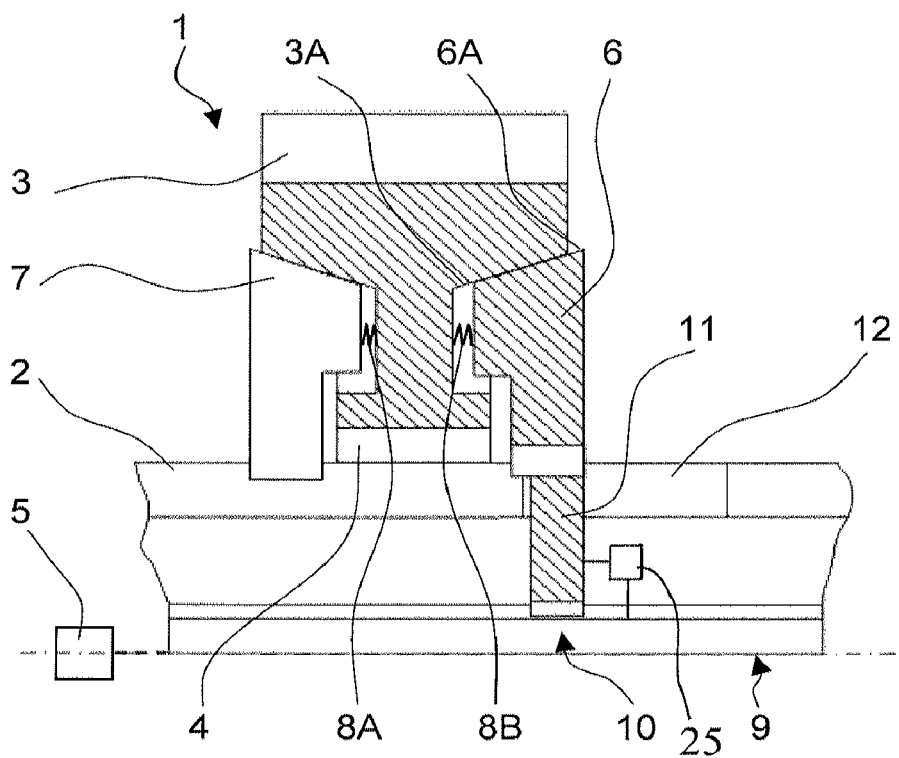
FIG. 2 is a device of FIG. 1 in an operating condition in which the gear wheel is rotationally fixed in connection with the shaft.

An area 6A of the actuating element 6 is of conical shape and, when the component 3 is in the engaged condition, is in active frictional connection with an also conically shaped area 3A in the manner shown in FIG. 2. In addition, the abutment element 7, arranged on the side of the component 3 facing away from the actuating element 6, is also conically shaped in a circumferential area 7A facing towards the component 3 and co-operates with a second area 3B equivalent to an area 3A of the component 3 to connect the component 3 in a rotationally fixed manner relative to the shaft 2 by way of a frictional connection, and to support any tilting torques on the shaft 2 that act on the component 3 in the area of the abutment element 7 in the same manner as the actuating element 6.

The inclinations of the conical surfaces of the areas 3A, 6A, 3B and 7A are, in this case, smaller than the friction angle so that when the rotationally fixed connection, between the component 3 and the shaft 27 is released, i.e., when the actuating element 6 is actuated accordingly by the actor, the component 3 automatically moves out of contact with it and with the abutment element 7 and becomes free to rotate relative to the shaft 2. To support the release of the component 3, spring devices 8A, 8B are provided respectively both between the abutment element 7 and the component 3 and between the component 3 and the actuating element 6. In this case, the spring device 8A pushes the component 3 in the direction of the actuating element 6 while, in contrast, the spring device 8B acts upon the actuating element 6 with a spring force directed away from the component 3.

In the present case, the actor 5 is made as an electric motor, which is connected in a rotationally fixed manner to the shaft 2. A motor output shaft of the electric actor 5 (not shown) is connected rotationally fixed to a spindle 9 of a spindle-nut arrangement 10 so that when the actor drives it this rotates the spindle 9 and a nut 11 engaged with the spindle 9 which, in this case, passes in the radial direction through the shaft 2 in the area of a slot 12 and is rotationally fixed, relative to the shaft 2 in the area of the slot 12, is moved in the axial direction of the shaft 2 away from the component 3 or toward it. The nut 11 is connected firmly to the actuating element 6 so that an axial movement of the nut 11 is transmitted directly to the actuating element 6.

In the example embodiment of the device 1, shown in FIGS. 1 and 2, the spindle-nut arrangement 10, which constitutes a drive conversion device, is made self-locking and thus constitutes a holding device associated with the actuating element 6 by way of which the actuating element 6 can be held in the shift condition at least equivalent to the rotationally fixed condition of the component without being actuated by the actor. In a simple manner, this makes it possible to maintain the pre-stress, between the actuating element 6 and the component 3, required for the rotationally fixed connection of the component 3 to the shaft 2 without the need for the actor 5 to perform any holding work. The system improves the efficiency of the transmission, compared with conventional transmissions in which holding energy has to be provided by an actor to maintain the rotationally fixed connection between a gear wheel and a shaft.

By way of the spindle 9 of the spindle-nut arrangement 10, the pressing force, in the area between the actuating element 6 and the component 3 and between the component 3 and the abutment element 7, can be finely adjusted, as is necessary in particular during synchronization processes between the component 3 and the shaft 2, to ensure a high level of driving comfort. Furthermore, a high transmission ratio can be produced by way of the spindle-nut arrangement 10, between the actor 5 and the actuating element 6, so that high pressing forces with a low torque of the actor 5 can be produced in a simple manner.

In a design of the device, according to the invention, alternative to the first embodiment shown in FIGS. 1 and 2, the actor producing the rotary drive is made as a motor that can be operated by a fluid pressure medium, for example a hydraulic or pneumatic motor, such that the spindle 9 of the spindle nut arrangement 10 can be driven in rotation in the manner described above according to FIGS. 1 and 2.

An actor made as an electric motor or as a fluid motor can preferably be configured as a stepping or a swiveling motor so as to be able to actuate the actuating element 6 to the extent necessary for the operation of the device while, at the same time, positioning the actuating element in a simple manner. In addition, to ensure exact positioning, rotary-drive actors of the device can be associated with angle sensors.

Moreover, in a further development of the device 1 according to FIGS. 1 and 2, the actor 5 is made with a detent element 25 that co-operates with the motor output shaft so as to be able to hold the actuating element 6 in its current shift condition without actuation on the part of the actor. The detent can be provided in addition or alternatively to the self-locking of the spindle-nut arrangement 10.

Figure 3:
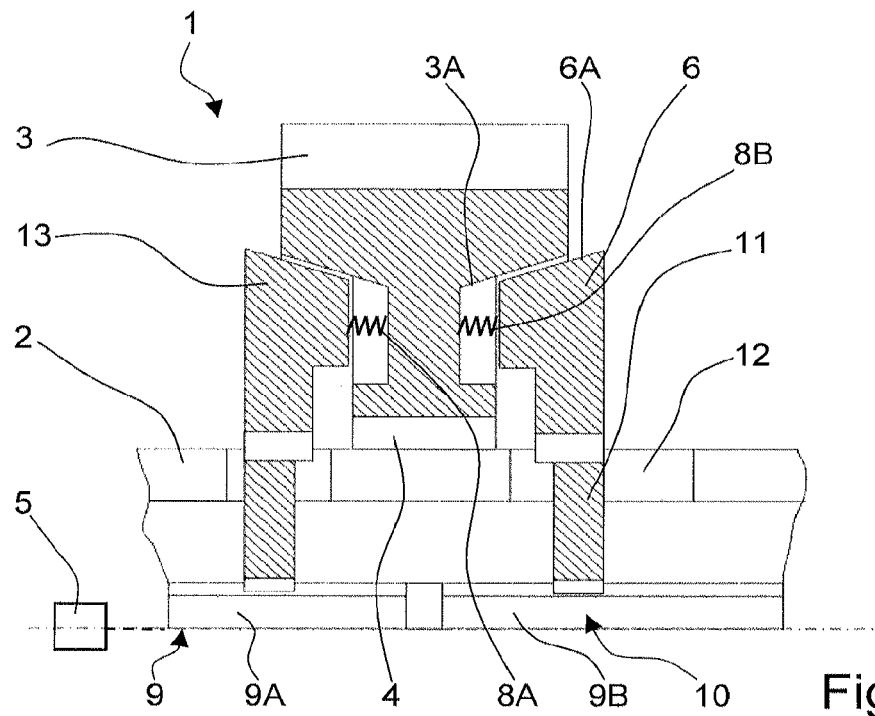
FIG. 3 is a second embodiment of the device, according to the invention, in an operating condition in which a gear wheel is free to rotate relative to a shaft, and two actuating elements are associated with the gearwheel.
Figure 4:
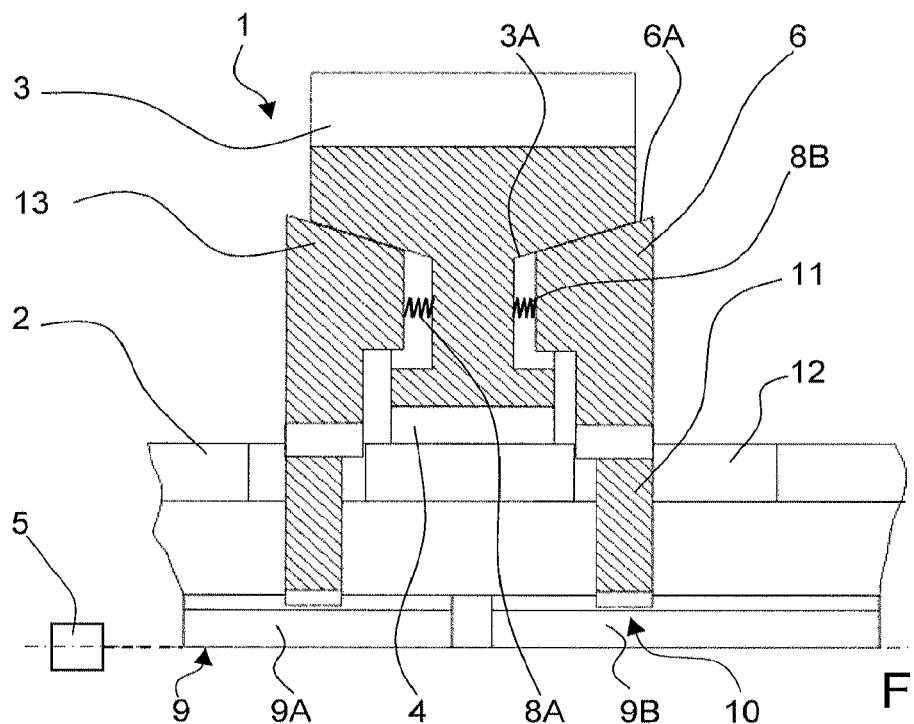
FIG. 4 is a device, according to FIG. 3, in an operating condition in which the gear wheel is in rotationally fixed connection with the shaft.

FIG. 3 and FIG. 4 show a second embodiment of the device 1 for connecting the shaft 2 in a rotationally fixed manner to the component 3 mounted to rotate on the shaft 2, FIG. 3 showing the rotating condition of the component 3 on the shaft 2 and FIG. 4 its rotationally fixed condition.

In the embodiment of the device 1, shown in FIGS. 3 and 4, two actuating elements 6 and 13 arranged and able to move on the shaft 2 in the axial direction, relative to the component 3, are associated with the latter so as to be able to convert the component 3 from a condition in which it can rotate, relative to the shaft 2, to a rotationally fixed condition or from a rotationally fixed condition to one in which it can rotate. The two actuating elements 6 and 13 are made in the same way and their design and mode of operation correspond to those of the actuating element 6 described in FIGS. 1 and 2, so that reference can be made here to the previous description and only the differences between the device 1 according to FIG. 3 and the device 1 according to FIG. 1 will be described in more detail below.

When the actor produces a rotary driving force, the two actuating elements 6 and 13 are moved by the spindle 9 common to them in the axial direction toward or away from the component 3. So that the actuating elements 6 and 13 will move in opposite directions to one another to engage or disengage the component 3 or gear wheel, as the case may be, the spindle 9 is made with two threaded sections 9A and 9B whose respective thread pitches run in opposite directions. Thus, when the spindle 9 rotates, the actuating elements 6 and 13 are each actuated by the amount needed in order to shift the component 3.

Figure 5:
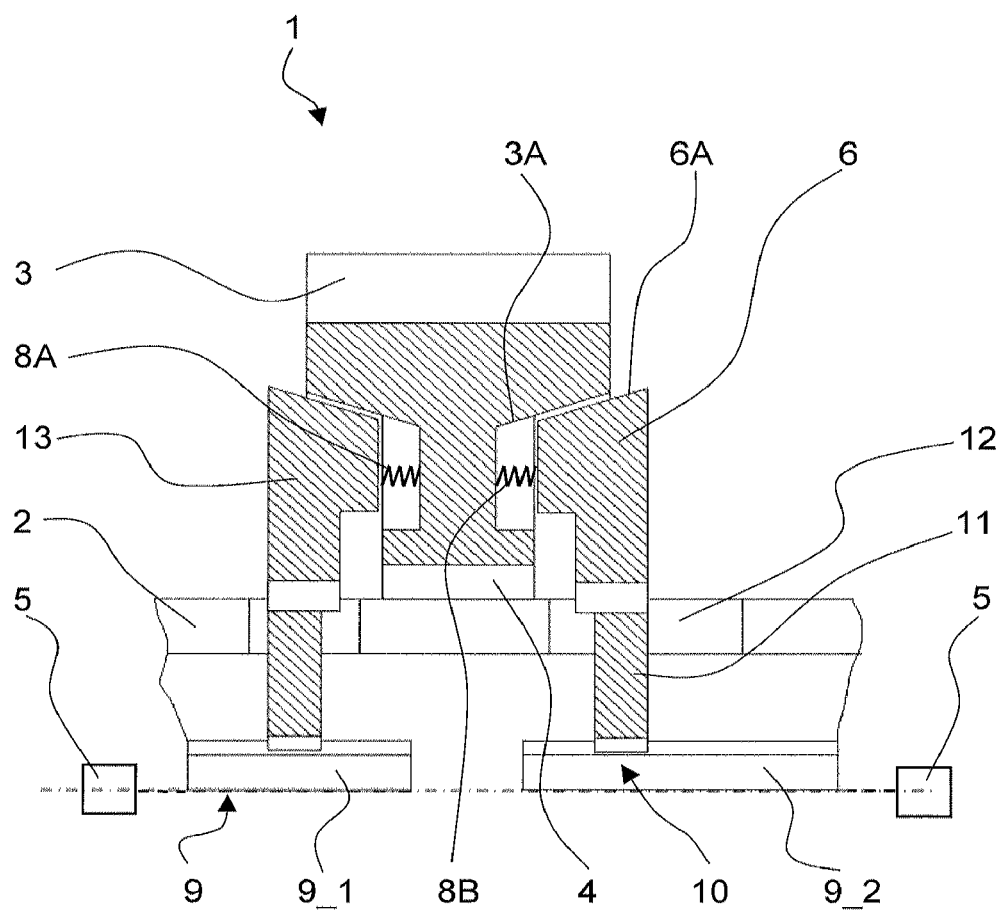
FIG. 5 is a further development of the embodiment, shown in FIG. 3, in which each actuating element can be driven by a separate threaded spindle.

FIG. 5 shows a further development of the embodiment of the device 1, shown in FIGS. 3 and 4, which differs from the device, according to FIGS. 3 and 4, only in the area of the rotary drive and in the area of the spindle 9 that transmits the drive from the actor so that in what follows only those differences will be described.

The embodiment of the device 1, according to FIG. 5, is made with two actors 5A and 5B, which can drive two separate spindles 9_1 and 9_2 in rotation, independently of one another, so as to bring the component 3 into rotationally fixed connection or free it to rotate relative to the shaft 2. The spindles 9_1 and 9_2 can be made with the same thread if the actors 5A and 5B are operated in respectively opposite directions.

Figure 6:
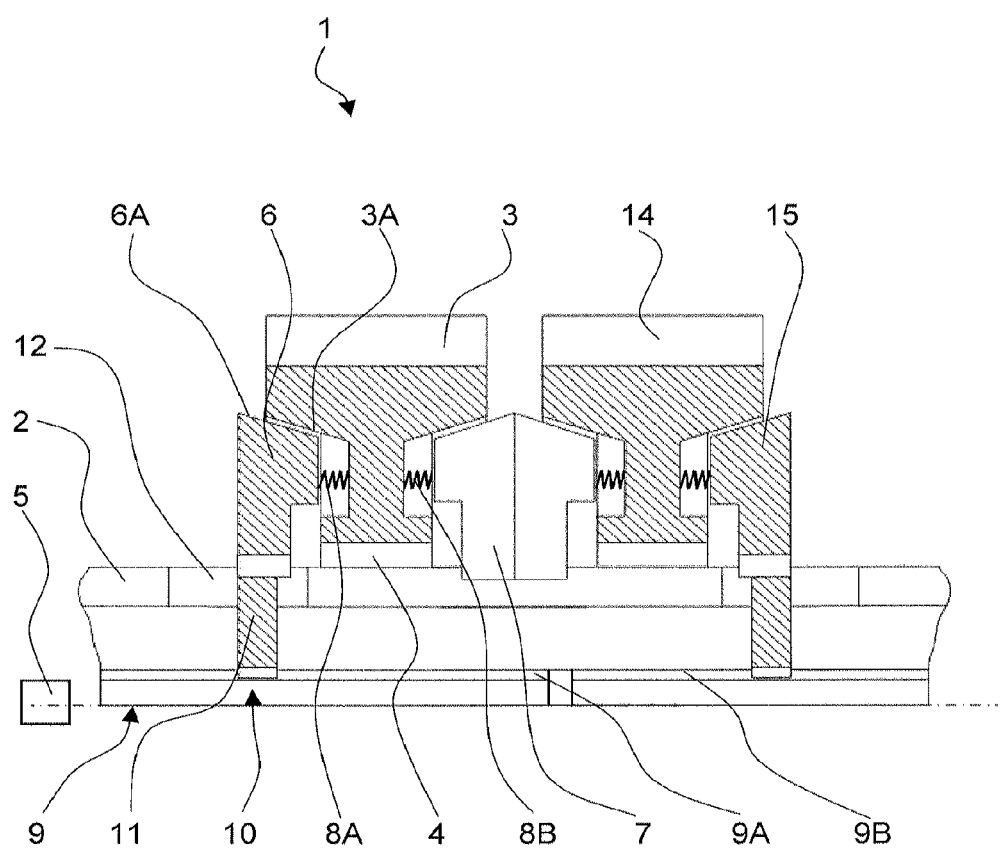
FIG. 6 is another embodiment of the device according to the invention, in which two gear wheels can be actuated, each by an actuating element, which are each supported against an abutment surface fixed on the shaft between the gear wheels.

Another embodiment of the device 1 is shown in FIG. 6, in which two gear wheels 3 and 14, made as loose wheels, can be engaged or disengaged in the manner described for FIGS. 1 and 2, by way of respective actuating elements 6 and 15. For this, the actuating element 6 is arranged on the side of the gear wheel 3, facing away from the gear wheel 14, while the actuating element 15 cooperates with the gear wheel 14 on the side thereof, facing away from the gear wheel 3. Between the two gear wheels 3 and 14, an abutment element 7 is arranged, which cooperates with both the gearwheel 3 and the gearwheel 14 by virtue of conically shaped friction surfaces for the rotationally fixed connection of the gear wheels 3 and 14 to the shaft 2, and which is fixed on the shaft 2 so that it cannot move either in rotation or axially relative to the latter.

In this case, the actuating elements 6 and 15 are actuated by the common spindle 9, and again the movement of the actuating elements 6 and 15 in opposite directions is produced by threaded sections 9A and 9B having opposing thread pitches.

Figure 7:
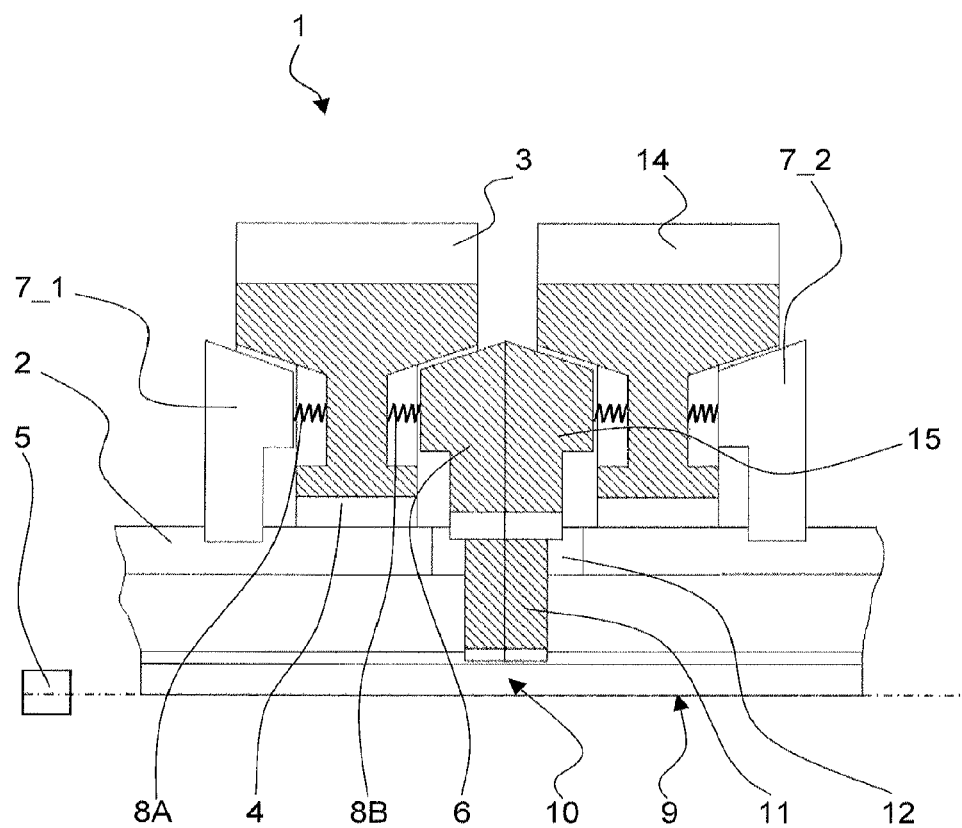
FIG. 7 is a further development of the device, according to the invention shown in FIG. 6, in which an actuating element arranged between the two gear wheels is associated with both of them and the gear wheels can each by supported against abutment surfaces fixed on the shaft.

The embodiment of the device 1, shown in FIG. 7, corresponds essentially to the device 1, shown in FIG. 6, but here the actuating elements 6 and 15 of the device 1 in FIG. 6 provided for the rotationally fixed connection of the gear wheels 3 and 14 are made in one piece and are arranged between the gear wheels 3 and 14. In addition, with the two gearwheels 3 and 14 are respectively associated abutments 7_1 and 7_2, against which the gear wheels 3 and 14 rest respectively when in the rotationally fixed condition, as described earlier for FIG. 1.

This means that by appropriate actuation of the actuating element 6 and consequent translational displacement of the actuating element 6, the gear wheels 3 and 14 can be rotationally fixed on the shaft 2 or released to rotate relative to the shaft 2.

Figure 8:
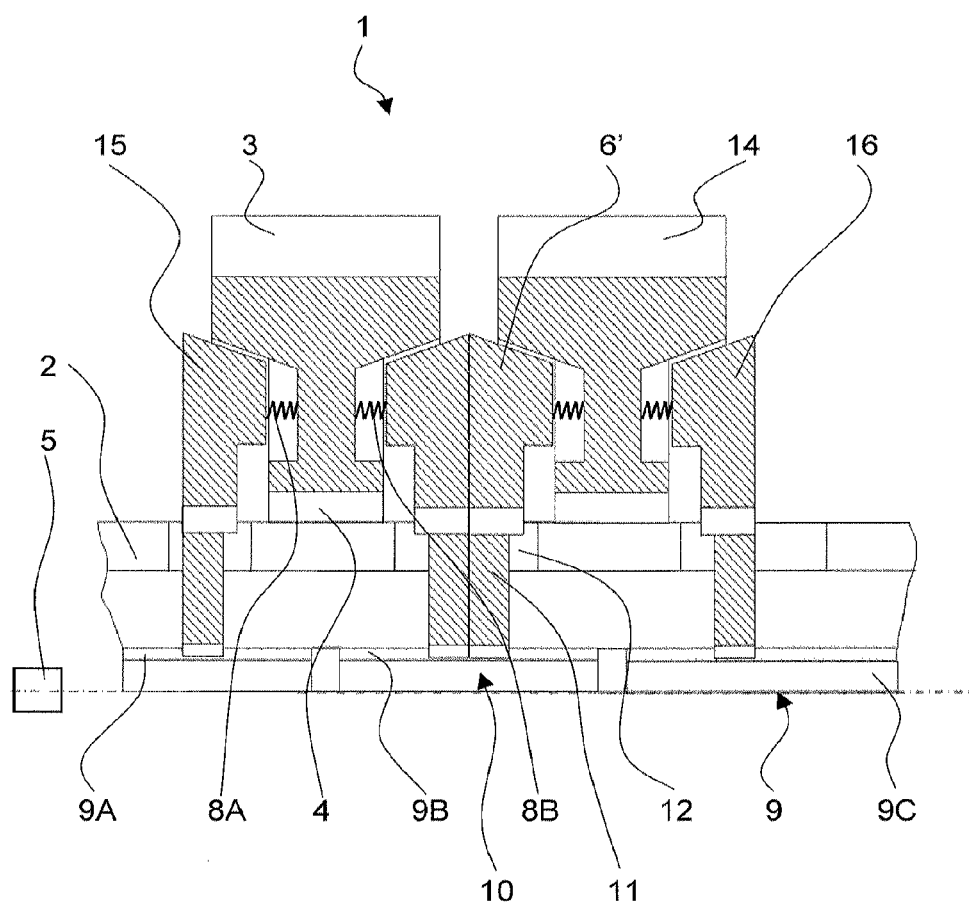
FIG. 8 is a further development of the embodiment of the device, according to the invention shown in FIG. 7, in which three actuating elements are provided for the rotationally fixed connection of the gear wheels.

In the embodiment of the device 1, shown in FIG. 8, three actuating elements 6', 15 and 16 are associated with the two gear wheels 3 and 14, the actuating element 6', corresponding to the actuating elements shown in FIG. 7, whereas in the device 1, according to FIG. 8, the two abutment elements 7_1 and 7_2, fixed on the shaft in FIG. 7, are now replaced by the actuating elements 15 and 16 rotationally fixed on the shaft 2, but able to move relative to it in the axial direction.

All three of the actuating elements 6', 15 and 16 are actuated by a common spindle 9 that can be driven by an actor 5 which, in this case, has three threaded sections 9A, 9B and 9C. In this, the threaded sections 9A, 9B and 9C are matched to one another in such a manner that, depending on the rotational direction of the rotary drive of the actor 5, actuating elements 6' and 15 or actuating elements 6' and 16 are moved toward the gear wheel 3 or towards the gear wheel 14, or respectively away from them.

Figure 9:
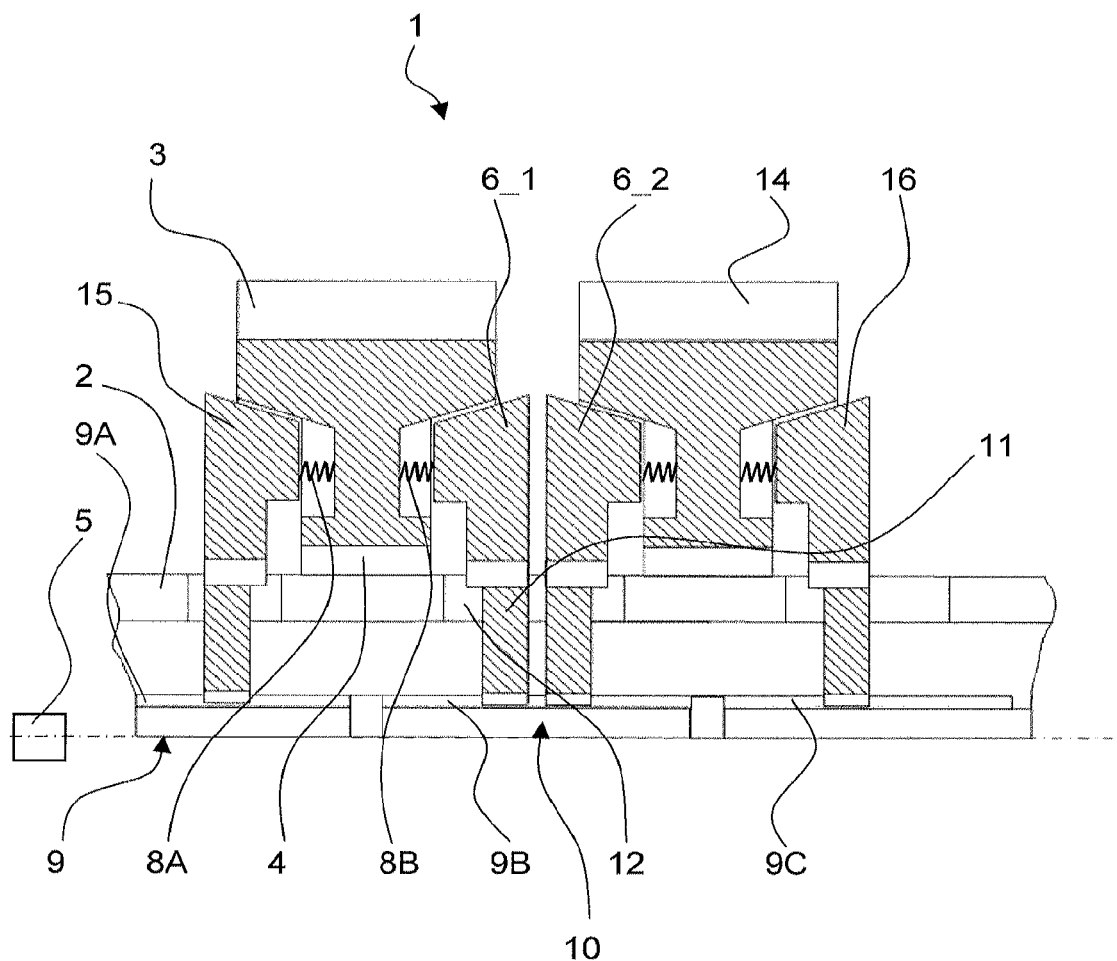
FIG. 9 is a further development of the embodiment of the device, according to the device shown in FIG. 8, in which the actuating elements are associated with each gear wheel.

FIG. 9 shows a further development of the embodiment of the device 1 illustrated in FIG. 8 in which, to actuate the gear wheels 3 and 14, two separate actuating elements 6_1 and 6_2 are arranged between them which, besides the actuating elements 15 and 16, can also be actuated by the actor 5, via a common spindle 9 with three threaded sections 9A, 9B, 9C to engage and disengage the gearwheels 3 and 14.

Figure 10:
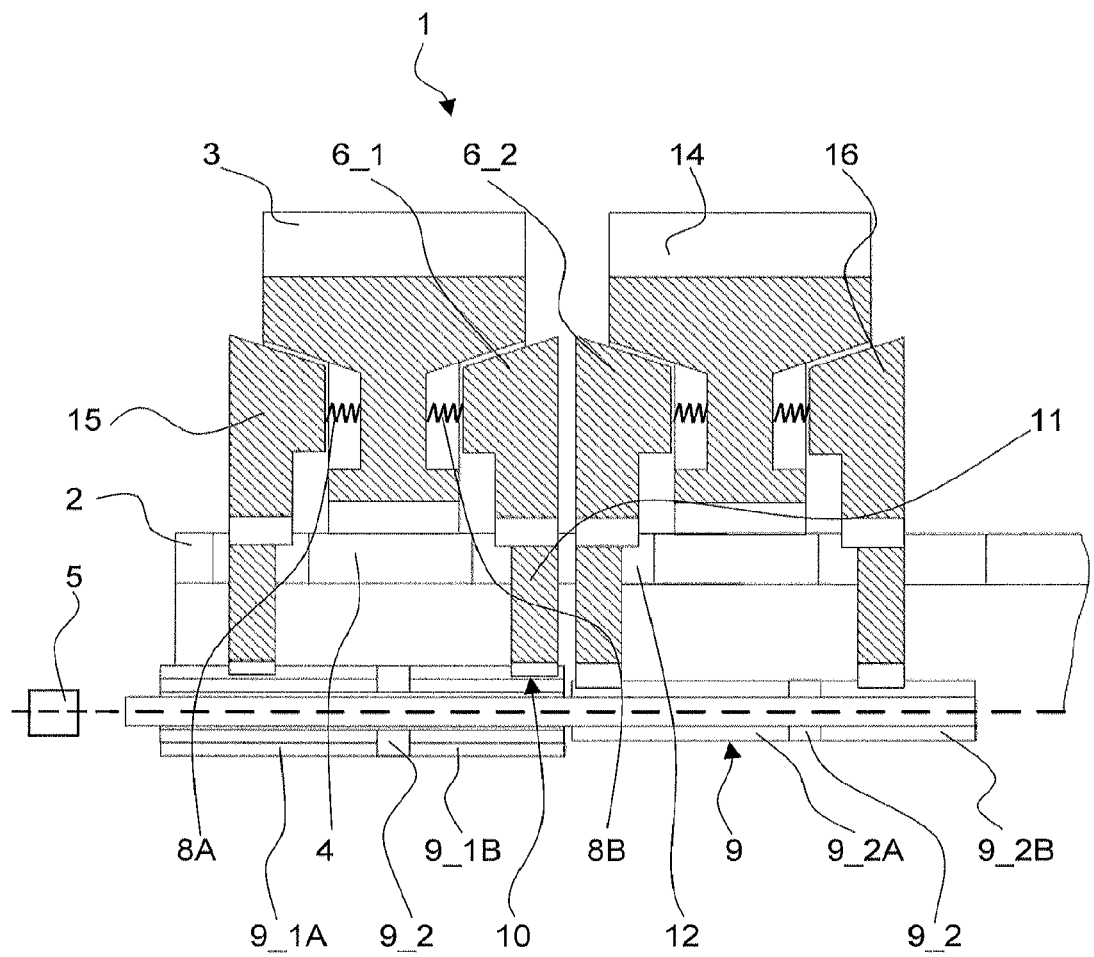
FIG. 10 is an embodiment of the device, according to the invention corresponding to the embodiment shown in FIG. 9, in which a threaded spindle that controls two of the actuating elements is made as a hollow shaft.

In the embodiment of the device 1, shown in FIG. 10, which differs from that shown in FIG. 9 only in the area of the spindle 9, the actor 5 is connected to the actuating elements 6_1, 6_2, 15 and 16 by a two-part spindle 9. A first part 9_1 of the spindle 9 is made as a hollow shaft by a section of which a second part 9_2 of the spindle 9 is guided. The first part 9_1 of the spindle 9 is engaged with the actuating elements 15 and 6_1, via two threaded sections 9_1A, 9_1B, while the second part 9_2 of the spindle 9 is in active connection with the actuating elements 6_2 and 16 via two threaded sections 9_2A and 9_2B. In addition, the second part 9_2 of the spindle 9 is connected to the first part 9_1 of the spindle 9 in such a manner that the rotational drive of the actor 5 is transmitted from the second part 9_2 to the first part 9_1 of the spindle 9 and the actuating elements 6_1, 6_2, 15 and 16 can be actuated to the required extent.

The spindle 9 or the parts 9_1 and 9_2 of the spindle 9 of the various example embodiments of the device 1, according to the invention shown in FIGS. 1 to 10, are in the present context supported on the shaft or on a component of the transmission fixed on its housing, depending on the design of the actuators, so as to be able to support the axial force required for the actuation of the actuating elements.

To determine an actor as a function of an actuating force applied to the actuating element and thus to the component or gear wheel, in the area between the spindle and the shaft or between the spindle and the housing, a force measurement device is provided, where the actor can be controlled and/or regulated as a function of the actuating force determined.

Besides the actuation of an actuating element from the inside of the shaft outwards by way of a spindle-nut unit whose spindle extends inside the shaft as described earlier, in another advantageous embodiment of the invention, it is provided that, associated with the actuating element, there is a ring that can be rotated from outside in relation to the inside of the shaft, which transmits the axial force required for actuating a component or gear wheel from an actor to the actuating element.

Figure 11:
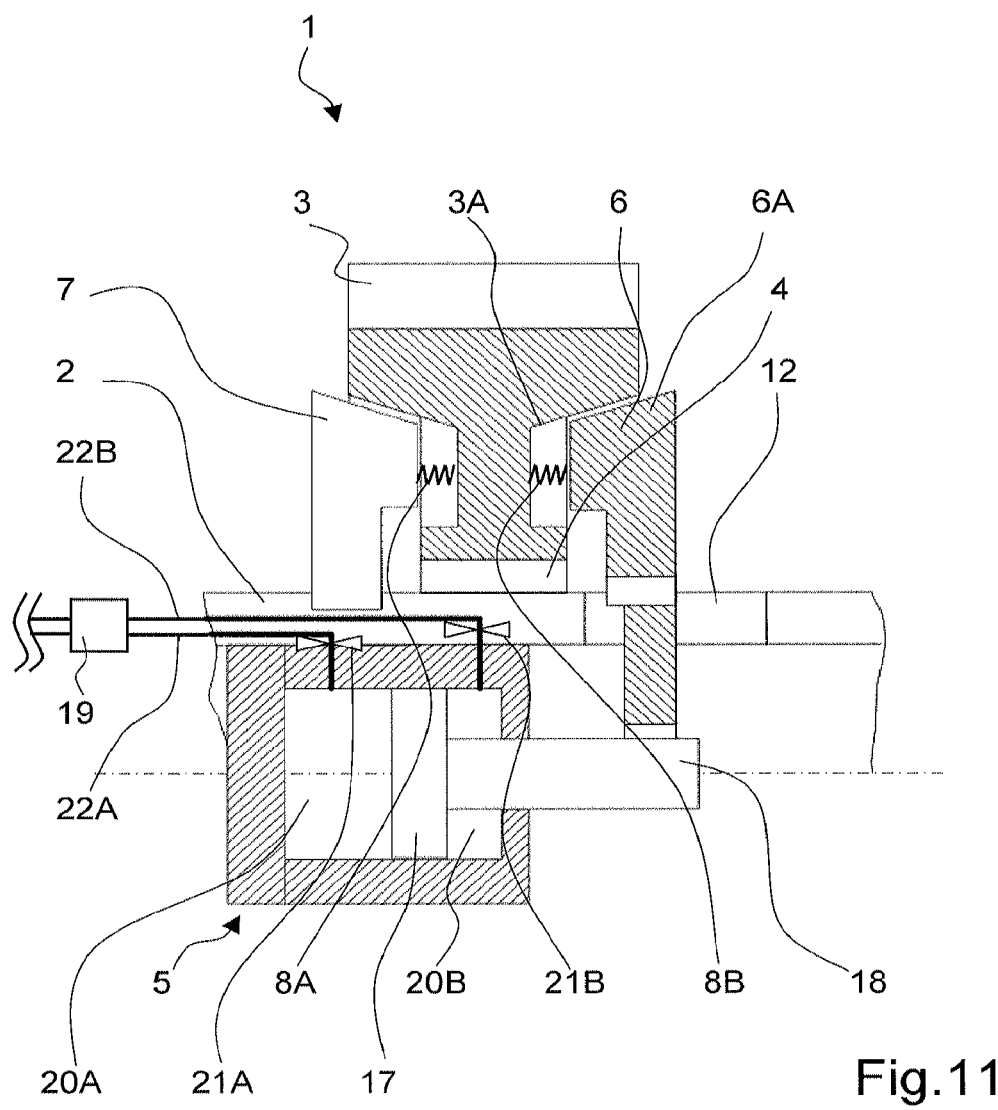
FIG. 11 is another embodiment of the device, according to the invention, which is formed with an actor made as a piston-cylinder unit for the actuation of an actuating element.

FIG. 11 shows an embodiment of the device 1, according to the invention, in which the gear wheel 3 can be connected in a rotationally fixed manner to the shaft 2 or released to rotate relative to it, by way of an actuating element 6 that can be actuated by an actor 5 configured as a piston-cylinder unit and the abutment element 7. The actor 5, made as a piston-cylinder unit, can be actuated by a fluid pressure medium and is actively connected to the actuating element 6 by a piston rod 18 connected to a piston 17. In addition, a pressure measurement device 19 is associated with the actor 5 to determine the pressure present in piston spaces 20A and 20B. The pressure in the piston spaces 20A and 20B, determined by the pressure measurement device 19, is used for the force-controlled regulation of the build-up of a normal force acting on the gear wheel 3.

In the holding condition of the piston-cylinder unit 5, to avoid pressurizing the piston spaces 20A and 20B from a pressure source in a manner that would adversely affect the efficiency of a transmission, the holding device is designed to hold the actuating element 6, at least in the shift position equivalent to the rotationally fixed condition of the gear wheel 3, by way of valve devices 21A and 21B without actuation on the part of the actor. By way of the valve devices 21A and 21B, pressure medium lines 22A and 22B that connect the actor 5 to a hydraulic actuating system (not shown) can be blocked so as to be able to hold the actor 5 in a defined operating condition without further pressurization. For this, the valve devices are blocking valves provided in addition to the control valves that regulate the respective pressure in the piston spaces 20A and 20B.

Alternatively, in an embodiment of the device 1 according to FIG. 11 (not shown in the drawing), the holding device is made with detent means by virtue of which a movement of the piston 17, relative to the cylinder of the piston-cylinder unit 5, can be prevented by mechanical locking of the piston 17 with the cylinder.

Besides the detent means of the piston 17, it is also possible to make the piston 17 of the piston-cylinder unit 5 self-locking, so that the piston 17 only moves relative to the cylinder when there is a sufficient pressure drop between the piston space 20A and the piston space 20B.

In the present case, the hydraulic actuating system is integrated in a hydraulic system of the transmission, but in other embodiments of the device according to the invention, depending on the application in question, it can be provided that the hydraulic actuating system is made as an independent, engaged hydraulic circuit for the control of the actuating elements.

Basically, actors made both as a fluid motor and as a piston-cylinder unit can be operated by a hydraulic or gaseous pressure medium to connect a component, mounted to rotate on a shaft, to the shaft in a rotationally fixed manner as described earlier.

Moreover, the actors provided to apply the actuation energy can be arranged inside or outside the shaft and connected in a rotationally fixed manner thereto or made rotationally fixed relative to the shaft and, in the case of a rotationally fixed configuration of an actor relative to the shaft, rotational speed decoupling means must be provided between the actuating element fixed on the shaft and a transmission element, i.e., a spindle or a piston rod, which is driven in rotation or translation by the actor. For this, to reduce friction losses the speed decoupling means can be made as a slide bearing or roller bearing device by which axial forces can be transmitted.

In a further design version of the device according to the invention (not shown in the drawing), this is made for shifting two or more gear wheels only with one actor to apply the actuating force for the engagement or disengagement of a component or gear wheel with which one or more selector actors are associated. By way of a selector actor, a choice can be made between the various components or loose wheels to be actuated by the one actor in such a manner that the gear wheel or component selected by the selector actor or the actuating element associated with it is acted upon by the actuating energy produced by the actor.

For this, a selector actor can preferably be made as a shift magnet or clutch which, between the actor of the device and the component or gear wheel to be actuated by the device, forms the connection required respectively for the actuation of the component or gear wheel or the actuating element associated with it.

Besides the embodiments of the device according to the invention shown in the drawing, in which the actuating elements are, in each case, made with one friction surface, it is provided in other embodiments of the device, according to the invention (not shown), that an actuating element is made with a plurality of friction surfaces, all simultaneously in active connection with a plurality of friction surfaces actively connected with the component or gear wheel in order to connect the component, by friction, in a rotationally fixed manner to the shaft.

Regardless of the configuration of the device, according to the invention, with one or more actors, to connect a component or gear wheel arranged to rotate on the shaft in a rotationally fixed manner to the shaft, the component can be acted upon by one more actuating elements either with the maximum normal force required for this, or with an equivalent actuating force that depends on the torque to be transmitted in each case and, in the latter procedure, active adjustment on the part of the actor is possible, although this entails higher control and regulation cost and effort.

| Reference numerals | |
| --- | --- |
| 1 | device |
| 2 | shaft |
| 3 | component, gear wheel |
| 3A, 3B | conically shaped area |
| 4 | bearing device |
| 5 | actor |
| 6, 6' | actuating element |
| 6A | conically shaped area |
| 6_1, 6_2 | actuating element |
| 7 | abutment element |
| 7A | conically shaped area |
| 7_1, 7_2 | abutment element |
| 8A, 8B | spring device |
| 9 | spindle |
| 9A, B, C | threaded sections |
| 9_1, 9_2 | spindle part |
| 9_1A, 9_1B | threaded sections |
| 9_2A, 9_2B | threaded sections |
| 10 | spindle-nut arrangement |
| 11 | nut |
| 12 | slot |
| 13 | actuating element |
| 14 | gear wheel |
| 15 | actuating element |
| 16 | actuating element |
| 17 | piston |
| 18 | piston rod |
| 19 | pressure measurement device |
| 20A, B | piston space |
| 21A, B | valve device |
| 22A, B | pressure medium line |

The invention claimed is:

1. A device (1) for connecting, in a rotationally fixed manner, a shaft (2) and at least one component (3) which is rotatably supported on the shaft (2), the device (1) comprising:
   at least one actuating element (6, 15, 16) being supported by the shaft (2) in a rotationally fixed, but axially slidable manner;
   the at least one component (3) being axially slidable along the shaft and having first and second frictional surfaces;
   an actor (5), which with an actuating force axially displaces the at least one actuating element (6, 15, 16) such that the at least one actuating element (6, 15, 16) axially biases the at least one component (3), and the at least one actuating element (6, 15, 16) frictionally engages the first frictional surface of the at least one component (3) such that the at least one component (3) and the shaft (2) rotate at essentially an equal speed;
   at least one spring device (8A, 8B) being located radially inward of the frictional engagement between the at least one component (3, 14) and the at least one actuating element (6, 15, 16) for separating the at least one component (3, 14) from the at least one actuating element (6, 15, 16), and
   a holding device for retaining the active frictional connection between the at least one actuating element (6, 15, 16) and the at least one component (3), without the actor (5) providing a further actuating force, such that the at least one component (3) is connected, via the at least one actuating element (6, 15, 16), in a rotationally fixed manner with the shaft (2).

2. The device according to claim 1, wherein the actor (5) is at least partially inside the shaft (2) and the at least one actuating element (6, 15, 16) is actuated by the actor (5) from inside of the shaft (2).

3. The device according to claim 1, wherein the actor (5) is located exterior to the shaft (2) and the at least one actuating element (6, 15, 16) is actuated by the actor (5).

4. The device according to claim 1, wherein the actor (5) is connected to the shaft (2) in a rotationally fixed manner.

5. The device according to claim 1, wherein the actor (5) is formed rotationally fixed relative to the shaft (2).

6. The device according to claim 1, wherein the holding device is located adjacent the actor (5).

7. The device according to claim 1, wherein the actor (5) is a swivelling motor operated by a fluid pressure medium.

8. The device according to claim 1, wherein the actor (5) is a piston-cylinder unit with a piston (17) and a piston rod (18) and is actuated by a fluid pressure medium, the at least one actuating element (6) is actively connected, via the piston rod (18), to the piston (17), such that the piston (17) displaces the at least one actuating element (6).

9. The device according to claim 8, wherein at least one pressure measuring device determines a pressure in each of a piston chamber (20A, 20B) of the piston-cylinder unit, and the pressure measurement is considered in a force-controlled regulation of a normal force build-up acting on the at least one component (6).

10. The device according to claim 8, wherein the holding device comprises valve devices (21A, 21B) in pressure medium lines (22A, 22B) which connect the actor (5) to a hydraulic actuation system, and the valve devices (21A, 21B) closes the pressure medium lines (22A, 22B) to retain the actor (5) in a defined operating condition.

11. The device according to claim 8, wherein the holding device, in an activated condition, prevents any movement of the piston (17) relative to the cylinder-piston unit (5) by mechanically locking the piston (17) to a cylinder.

12. The device according to claim 1, wherein the at least one actuating element (6, 15, 16) is associated with the component (3, 14), which is braced, by a contact surface of an abutment element (7) fixed to the shaft (2), against axial movement of the at least one actuating element (6, 15, 16) toward the at least one component (3, 14) when rotationally fixing the at least one component (3, 14) to the shaft (2).

13. The device according to claim 1, wherein two components (3, 14) are provided which are both closely supported on the shaft (2) and each of the two components is associated with an individual actuating element (6, 15, 16), and each of the two components (3, 14) is braced on a respective contact surface of an abutment element (7_1, 7_2), which is fixed on the shaft (2), against axial movement toward the two components (3, 14) by the at least one actuating element (6, 15, 16), when rotationally fixing the two components (3, 14) to the shaft (2).

14. The device according to claim 1, wherein two components (3, 14) are provided which are both closely supported on the shaft (2) and are associated with at least two actuating elements (6, 15, 16), a first of the two components (3) is braced by a contact surface fixed on the shaft (2) against axial movement by the at least two actuating elements (6, 15, 16) toward the two components (3, 14) when connecting the two components (3, 14) in a rotationally fixed manner to the shaft (2), while the a second of the two components (14) is supported by at least a second actuating element (6, 15, 16) when connected in a rotationally fixed manner to the shaft (2).

15. The device according to claim 1, wherein the device comprises a first and second spring devices (8A, 8B), the first spring device (8A) is positioned on a first side of the at least one component (3, 14), between the at least one component (3, 14) and a first actuating element (6, 15, 16), the second spring device (8B) is positioned on an opposite second side of the at least one component (3, 14), between the at least one component (3, 14) and a second actuating element (6, 15, 16) so that the first and second spring devices (8A, 8B) assist with disengaging the frictional engagement between the first and second actuating elements (6, 15, 16) and the at least one component (3, 14), if an actuating force from the actor (5) drops below a certain value.

16. The device according to claim 1, wherein a plurality of gear wheels are actuated by the actor (5), and active connections between the actor (5) and the gear wheels is, in each case, engaged and disengaged by a selector actor.

17. A device (1) for connecting, in a rotationally fixed manner, a shaft (2) and at least one component (3) which is rotatably supported on the shaft (2), the device (1) comprising:
  at least one actuating element (6, 15, 16) being supported by the shaft (2) in a rotationally fixed, axially slidable manner;
  the at least one component (3) being axially slidable along the shaft and having first and second frictional surfaces;
  an actor (5), which with an actuating force axially displaces the at least one actuating element (6, 15, 16) such that the at least one actuating element (6, 15, 16) axially biases the at least one component (3), and the at least one actuating element (6, 15, 16) frictionally engages the first frictional surface of the at least one component (3) such that the at least one component (3) and the shaft (2) rotate at essentially an equal speed; and
  a holding device for retaining the active frictional connection between the at least one actuating element (6, 15, 16) and the at least one component (3), without the actor (5) providing a further actuating force, such that the at least one component (3) is connected, via the at least one actuating element (6, 15, 16), in a rotationally fixed manner with the shaft (2); and
  the actor (5) providing rotary drive movement which is converted into a translational actuation movement by a drive conversion device (10) arranged between the actor (5) and the at least one actuating element (6, 15, 16).

18. The device according to claim 17, wherein the drive conversion device (10) is self-locking, and the actor (5) changes an operating condition of the drive conversion device (10).

19. The device according to claim 17, wherein the holding device has mechanical detent means (25) which cooperate with a motor output shaft of the actor (5).

20. The device according to claim 17, wherein one of a slide bearing device and a roller bearing device are provided between the drive conversion device (10) and the at least one actuating element (6, 15, 16).

21. The device according to claim 17, wherein the drive conversion device (10) is a spindle-nut arrangement.

22. The device according to claim 21, wherein a spindle (9) of the spindle-nut arrangement (10) is supported on one of the shaft (2) and a transmission housing.

23. The device according to claim 22, wherein a force measuring device is arranged between one of the spindle (9) and the shaft (2) and the spindle (9) and the transmission housing for determining the actuation force exerted by the actor (5) on the spindle (9), so the actor (5) is at least one of controlled and regulated as a function of the determined actuation force.

24. The device according to claim 22, wherein at least two actuating elements (6, 15) are actuated by the spindle (9), the spindle (9) has two threaded sections (9A, 9B) each with an oppositely directed thread pitch, a first threaded section (9A) communicates with a first of the at least two actuating elements (6) and a second threaded section (9B) communicates with a second of the at least two actuating elements (15).

25. The device according to claim 22, wherein a plurality of spindles (9_1, 9_2) are provided and are driven by the actor (5), at least a first spindle (9_1) is a hollow shaft through which at least a second spindle (9_2) extends between the actor (5) and the at least one actuating element (6, 15, 16).

26. A device (1) for connecting either a first or a second component (3, 14) to a shaft (2) in a rotationally fixed manner, the device (1) comprising:
  at least one component (3, 14) being axially slidably supported by the shaft (2) between an engaged and a disengaged position, the at least one component (3, 14) having first and second frictional surfaces;
  at least one actuating element (6, 15, 16) being supported by the shaft (2) in a rotationally fixed and axially slidable manner;
  an actor (5) which applies an actuating force on the at least one actuating element (6, 15, 16) to axially bias the at least one actuating element (6, 15, 16);
  an abutment being axially fixed to the shaft;
  first and second springs, the first spring axially located between the abutment and the at least one component and the second spring axially located between the at least one component and the at least one actuating element (6, 15, 16), the first and the second springs each applying a force to maintain the at least one component (3, 14) in the disengaged position;
  an actor (5) which applies an actuating force on the at least one actuating element (6, 15, 16) to axially bias, via the second spring, the at least one actuating element (6, 15, 16) toward the at least one component (3, 14) which axially biases the at least one component, toward the abutment, into the engaged position in which the first frictional surface engages the abutment and the second frictional surface engages the at least one component (3, 14) and the at least one component (3, 14) is connected to the shaft in a rotationally fixed manner; and a holding device for retaining the at least one component (3, 14) in the engaged position, without the actor (5) providing a further actuating force.

\* \* \* \* \*